United States Patent
Otsuka et al.

(10) Patent No.: US 6,864,685 B2
(45) Date of Patent: Mar. 8, 2005

(54) PROCESS FOR ANTICIPATING THE SERVICE LIFE OF A RARE GAS DISCHARGE LAMP AND A SYSTEM FOR ANTICIPATING THE SERVICE LIFE OF RARE GAS DISCHARGE LAMP

(75) Inventors: Masaharu Otsuka, Kakogawa (JP); Takeo Matsushima, Himeji (JP)

(73) Assignee: Ushiodenki Kabushiki Kaisha, Tokyo (JP)

( * ) Notice: Subject to any disclaimer, the term of this patent is extended or adjusted under 35 U.S.C. 154(b) by 63 days.

(21) Appl. No.: 10/423,948

(22) Filed: Apr. 28, 2003

(65) Prior Publication Data

US 2003/0203699 A1 Oct. 30, 2003

(30) Foreign Application Priority Data

Apr. 30, 2002 (JP) ........................................ 2002-128391

(51) Int. Cl.[7] ......................... G01R 31/00; G01R 19/00
(52) U.S. Cl. ........................ 324/410; 324/414; 702/34; 315/308
(58) Field of Search ................................ 324/403–414; 702/37; 315/291, 307, 308

(56) References Cited

U.S. PATENT DOCUMENTS

| 4,831,564 A | * | 5/1989 | Suga ........................... 702/34 |
| 2001/0010447 A1 | | 8/2001 | Yamane et al. ............. 313/113 |

FOREIGN PATENT DOCUMENTS

| JP | 11-121339 | 4/1999 |
| JP | 2001-85176 | 3/2001 |

* cited by examiner

*Primary Examiner*—Vincent Q. Nguyen
(74) *Attorney, Agent, or Firm*—Nixon Peabody LLP; David S. Safran

(57) ABSTRACT

The rare gas discharge lamp is supplied with a current, which is lower than the rated current, the voltage of the rare gas discharge lamp is determined at this instant and the swing width of this voltage is measured. A comparator for comparing measured values of the swing width of the voltage of the rare gas discharge lamp when the current control supplies a reduced current, which is lower than the rated current. A service life converter for converting the difference value output by the comparison means into an indication of the service life of the rare gas discharge lamp.

5 Claims, 5 Drawing Sheets

PROCESS FOR ANTICIPATING THE SERVICE LIFE OF A RARE GAS DISCHARGE LAMP AND A SYSTEM FOR ANTICIPATING THE SERVICE LIFE OF RARE GAS DISCHARGE LAMP

BACKGROUND OF THE INVENTION

1. Field of the Invention

The invention relates to a process for anticipating the service life of a rare gas discharge lamp and a system for anticipating the service life of a rare gas discharge lamp. The invention relates especially to a process for anticipating the service life of a rare gas discharge lamp which is a discharge lamp of the short arc type used as the light source of a projection device, a device for inspection of a liquid crystal cell or the like, a film or the like being irradiated with light and images being projected using this light. The invention furthermore relates to a system for anticipating the service life of a rare gas discharge lamp. The invention is useful, for example, in technical areas, such as in the above described projection device (projector), a device for inspection of a liquid crystal cell, stage illumination, a surgical lamp, an endoscope, a spotlight and the like as a new process for anticipating the service life of a rare gas discharge lamp which is used as a light source for them, and as a system for carrying out the process.

2. Description of Related Art

Conventionally, a rare gas discharge lamp as a discharge lamp of the short arc type is known which is used as the light source of a projection device, a device for inspection of a liquid crystal cell or the like, and in which the arc tube is filled with xenon gas. These rare gas discharge lamps have the function of producing spectra which are similar to sunlight, and are used to advantage in the above described technical areas. In these rare gas discharge lamps, the so-called flicker phenomenon occurs that, by drying out of the emitter substance of the cathode during operation, by wear of the electrodes and for similar reasons, after expiration of a certain operating interval, the arc suddenly begins to flicker and the image on the illumination surface flickers.

In these rare gas discharge lamps, as was described above, there was the disadvantage that flickering forms in the images and it becomes difficult to see the images if, for example, in the case of use as a light source of a projection device, the flicker phenomenon occurs. Furthermore, in these rare gas discharge lamps, there was the disadvantage that flickering occurs in the light which has passed through the liquid crystals and which has been projected on the test screen, and that it can no longer be correctly assessed in what area the liquid crystals are disrupted if, for example, in the case of use as a light source of a device for testing a liquid crystal cell, the flicker phenomenon occurs.

Such a flicker phenomenon in a rare gas discharge lamp can generally be determined as the magnitude of the fluctuation of the voltage of the lamp. The level (flicker level) at which the lamp becomes no longer usable due to the formation of the flicker phenomenon can be defined by the extent of the variation of the voltage even if this level differs depending on the type of lamp, the device in which the lamp is being used, the application and the like. FIG. 1 is a graph which shows the relationship between the service life of the lamp and the value (V) of the magnitude of the fluctuation of the voltage, referred to therein and below as the "swing width." In the plot C of FIG. 1, a case of lamp operation with a rated current (80 A) is shown in which the value of the swing width of the voltage at 0.35 V is constant for up to 900 hours, and in which, after 900 hours, the value of the swing width of the voltage rises quickly. The plot C of FIG. 1 shows that the flicker level increases quickly as soon as 900 hours are exceeded even to a small degree. Plot D of FIG. 1 shows a case of operation of a lamp of the same type (with the same rated current) at the rated current (80 A) in which the value of the swing width of the voltage at 0.35 V is constant up to 800 hours, and in which after 800 hours, the value of the swing width of the voltage rises quickly. Plot D of FIG. 1, likewise, shows that the flicker level increases quickly as soon as 800 hours are exceeded even to a small degree.

In this way, the flicker phenomenon of the rare gas discharge lamp can be determined as the swing width of the lamp voltage. However, since the flicker level rises quickly in a short time when a given time is exceeded, as is shown in FIG. 1, even if the attempt is made to check the level at which use as a lamp is no longer possible at the rated current due to formation of flicker phenomenon, by examining the swing width of the voltage at the rated current, there was the disadvantage that it is extremely difficult to determine the sign of the rise of the flicker level beforehand.

As is shown in FIG. 1, even in lamps of the same type (with the same rated current) for example, due to variances of the crystal state of the electrodes, different shapes of the electrode tip as a result of the problem of processing precision, different shapes of the bulb and the like, the instant at which the swing width of the voltage changes, i.e., the instant at which the flicker level rises, is individually different, therefore not the same, depending on the lamps. There was the disadvantage that anticipating the instant of rise of the flicker level of other lamps of the same type using the instant of rise of the flicker level of a single lamp is not practical because the time errors become too large. For example, in lamps with an average time of 1000 hours up to the instant of rise of the flicker level, the width of their time errors is roughly ±200 hours.

SUMMARY OF THE INVENTION

The invention was devised to eliminate the above described disadvantages in the prior art. Thus, a primary object of the present invention is to devise a new process which will reliably anticipate the service life of a rare gas discharge lamp. Furthermore, a parallel object of the invention is to develop a system for carrying out the process. That is, the object of the invention is to devise a new process for anticipating the service life of a rare gas discharge lamp in which, by determining the voltage which is an electrical property of the rare gas discharge lamp and by measuring the value of the swing width of this voltage, it becomes possible to anticipate the instant at which the flicker level which is characteristic of the respective rare gas discharge lamp rises to a certain level, and the instant of a rise to a level at which the lamp can not longer be used as a result of this flicker. Furthermore, the object of the invention is to devise a new system for anticipating the service life of a rare gas discharge lamp which is used in implementing the above described process.

The object is achieved in accordance with the invention by the following technical measures:

(1) In a process for anticipating the service life of a rare gas discharge lamp in which an opposed cathode and anode are disposed in an arc tube, and in which the cathode contains an emitter substance, the object is achieved in that the rare gas discharge lamp is supplied with a certain current which is lower than the rated current, that the voltage of the rare gas discharge lamp is determined at this instant and the swing width of this voltage is measured, and that the service life of the rare gas discharge lamp is anticipated using the value of the swing width of this voltage.

(2) In a process for anticipating the service life of the rare gas discharge lamp according to (1), the object is further achieved in that the remaining life of the lamp is anticipated by taking as a reference, the difference between the instant at which the value of the swing width of the voltage begins to increase in the case of operation at the rated current, and the instant at which the value of the swing width of this voltage begins to increase in the case in which the current is fixed at a lower value than the rated current.

(3) In a process for anticipating the service life of the rare gas discharge lamp according to (1), the object is furthermore achieved in that by comparing the value of the swing width of the voltage which is determined in the case in which the current is fixed at a lower value than the rated current, to a value of the swing width of the voltage at the instant of occurrence of flickering which is measured in the case in which the current is fixed beforehand at a lower value than the rated current, the remaining life of the lamp is anticipated.

(4) In a process for anticipating the service life of the rare gas discharge lamp according to (1), the object is furthermore achieved in that the value of the swing width of the voltage which is determined in the case of operation with a rated current, and the value of the swing width of the voltage which is determined in the case in which the current is fixed at a lower value than the rated current, are graphed beforehand with respect to the length of operation of the lamp and that the value of the swing width of the voltage at any instant of a lamp of the same type with a lifetime which is to be measured, is determined in the case in which the current is fixed at a lower value than the rated current, and based on the above described graphic representation, is converted into the remaining life of the lamp.

(5) In a device for anticipating the service life of the rare gas discharge lamp, in which an opposed cathode and anode are disposed in an arc tube, and in which the above described cathode contains an emitter substance, the object is achieved in that there are the following:
  a current control means which controls the current of the rare gas discharge lamp;
  a voltage detection means which determines the voltage of the rare gas discharge lamp;
  a voltage swing width detection means which determines the value of the swing width of the voltage based on the voltage which has been determined by the voltage detection means;
  a basic data memory mechanism which stores the value of the swing width of the voltage which is determined beforehand for the rare gas discharge lamp operated with the rated current by fixing the current at a lower value than the rated current at any time;
  a comparison means which compares the value of the measurement of the swing width of the voltage of the rare gas discharge lamp when the above described current control means supplies a certain current which is lower than the rated current, to the data stored by the basic data memory mechanism; and
  a duration of service life conversion means which, based on the difference between the values of the swing width of the voltage which are compared by the comparison means, converts the difference value into the service life of the rare gas discharge lamp.

The invention is further described below.

The process in accordance with the invention for anticipation of the lifetime of a rare gas discharge lamp is characterized in that the rare gas discharge lamp is supplied with a certain current during operation which is lower than the rated current, that the voltage of the rare gas discharge lamp is determined at this instant, that the swing width of this voltage is measured, that the instant at which the flicker level rises to a certain level based on the value of the swing width of this voltage, and the instant of a rise to a level at which the lamp can not longer be used as a result of the flickering are anticipated and that, in this way, the service life of the rare gas discharge lamp is anticipated.

The system in accordance with the invention for anticipating the service life of a rare gas discharge lamp is characterized in that there are the following:
  a current control means which controls the current of the rare gas discharge lamp;
  a voltage detection means which determines the voltage of the above described rare gas discharge lamp;
  a voltage swing width detection means which determines the value of the swing width of the voltage based on the voltage which has been determined by the above described voltage detection means;
  a separate basic data memory mechanism which stores the value of the swing width of the voltage which is determined beforehand for the rare gas discharge lamp operated with the rated current by fixing the current at a lower value than the rated current at any time;
  a comparison means which compares the value of the swing width of the voltage of the rare gas discharge lamp measured by the voltage swing width detection means when the above described current control means supplies a certain current which is lower than the rated current, to the data stored in basic data memory mechanism; and
  a duration of service life conversion means which, based on the difference between the values of the swing width of the voltage which are obtained by the above described comparison means, converts the comparison value into the service life of the rare gas discharge lamp.

In this invention, the specific means (components) for the above described process for anticipating the service life and for the system for carrying out the process are not specially limited, any suitable means be usable. Specifically, any means can be used if it has the above described function. Furthermore, according to the requirements of the device, such as a projection device, a liquid crystal cell tester or the like, it can be decided what extent of flicker, i.e., which level of the value of the swing width of the voltage, can be called the service life of the lamp. The lamp in which this flicker phenomenon occurs is a lamp in which the cathode contains an emitter substance. The invention is used for all those rare gas discharge lamps in which the cathode contains an emitter substance. The flicker phenomenon of a lamp is described below.

Flickering is determined by the efficiency of the emitter in the cathode of the lamp. In the case of lamp operation under certain conditions, the flicker phenomenon occurs and can be detected as flickering of the lamp, for example, as the phenomenon that the swing width of the voltage increases when the efficiency of the emitter falls below a threshold.

The efficiency of the emitter is determined by the state of the crystal grains of the tungsten in the tip area of the lamp cathode.

The relation between the efficiency of the emitter and the flickering is described below using schematic cross sections of the tip area of the lamp cathode. FIGS. 2A to 2C each show the bonding of the tungsten crystal grains in the tip area of the cathode. The lines within the tip represent the boundaries between the crystal grains. The emitter flows out through these grain boundaries on the tip of the cathode and therefore acts as an emitter. The efficiency of the emitter is determined by the number of these grain boundaries and the temperature. The larger the number of grain boundaries and the higher the temperature, the greater the efficiency. FIG. 2A shows a representation of the bonding of the crystal grains at the start of operation. In this case, the number of grain boundaries is large. Therefore, there is the state in which the emitter efficiency is high regardless of the size of the current (height or depth of the temperature of the cathode tip). In this case, therefore, the flicker phenomenon cannot be detected.

FIG. 2B shows the crystal grains in the state in which the flickering phenomenon can be recognized when the current is reduced to a value which is lower than the rated current. It becomes apparent that, in this case, the crystal grains merge and become very large and therefore the number of grain boundaries is less than in FIG. 2A. Since, in this state, the temperature of the cathode tip at the rated current is relatively high, the emitter efficiency has a value which is greater than or equal to the threshold value. By reducing the current, the temperature of the cathode tip becomes lower, by which the efficiency of the emitter is reduced to less than or equal to the threshold value and the flickering phenomenon is recognized.

FIG. 2C shows the state in which the above described merging of the crystal grains has continued on. In this state, at the rated current, the efficiency of the emitter can no longer exceed the threshold value, by which the flicker phenomenon becomes recognizable.

Since, in a rare gas discharge lamp, the arc tube is not filled with a metallic filler, but only rare gases, such as xenon, argon and the like, in lamp operation with a lower current than the rated current, the lamp is prevented from being extinguished and its voltage can be measured. In a rare gas discharge lamp, initially, the phenomenon always occurs that the voltage during operation fluctuates to an extremely small degree. FIG. 3 shows the data of the voltage value of a rare gas discharge lamp with a voltage of 30 V and a current of 80 A. Here, the X axis plots the length of operation, and the Y axis plots the voltage value. It becomes apparent from FIG. 3 that, during operation of a rare gas discharge lamp, the voltage fluctuates to an extremely small degree. In accordance with the invention, the voltage width between the maximum voltage value (MaxV) for 30 seconds before and after a certain instant t and the minimum voltage value (MinV) is defined as the swing width $\Delta V$ of the voltage at the certain instant t. In FIG. 3, the fluctuation width $\Delta V$ of the voltage at the certain instant t is shown using the formula:

$$\Delta V = (MaxV - MinV)$$

FIG. 4 shows graphic representations (A, B) of the relationship between the length of operation and the value of the swing width of the voltage in the cases of operation of two types of rare gas discharge lamps of the same type (with the same rated current) (lamps 1 and 2) at the rated current, and graphic representations (a, b) of the relationship between the length of operation and the value of the swing width of the voltage in the case of operation of these two types of rare gas discharge lamps (lamps 1 and 2) only at some instant and with a certain current which is lower than the rated current. Here, the rated current is 80 A. The specific current which is lower than the rated current is 40 A.

In the lamps 1 and 2, the value of the swing width of the voltage during several hundred hours after the start of operation in the case of current supply with a rated current of 80 A is 0.35 V and is constant. In lamp 1, the instant at which the value of the swing width of the voltage changes quickly is 1000 hours. In the lamp 2, the instant at which the value of the swing width of the voltage changes rapidly is 800 hours. In lamps 1 and 2, the time differs at which the value of the swing width of the voltage changes rapidly. This is because of the individual difference between the lamps, as was described above. As becomes apparent from the graphic representations a and b in FIG. 4, the value of the swing width of the voltage increases early both in the lamp 1 and also in the lamp 2 if a current which is lower than the rated current of 40 A is allowed to flow at any instant.

In the lamps 1 and 2, specifically, the instant at which the value of the swing width of the voltage becomes larger than in the case of operation with the rated current occurs earlier by fixing the current at a lower value than the rated current if the same type of lamp is operated under the same current conditions (generally at the rated current) even if the lamps have individual differences. Furthermore, in the two, the difference between the instant at which in the case of operation at the rated current the value of the swing width of the voltage begins to increase, and the instant at which the value of the swing width of this voltage begins to increase in the case of a lower value of the current than the rated current, is identical, if the same type of lamp is operated under the same current condition, even if the lamps have individual differences.

In FIG. 4, the values of E1 and E2 are identical. Furthermore, there is the tendency for the values of the swing width of the voltage after the start of the increase of the values of the swing width of the voltage for the two to acquire the same gradient in the graphic representation. In this way, if the same type of lamp is operated under the same current condition, the difference between the instant at which in the case of operation at the rated current the value of the swing width of the voltage begins to increase and the instant at which the value of the swing width of this voltage begins to increase in the case of a lower value of the current than of the rated current, acquires the same gradient and also the values of the swing width of the voltage after the values of the swing width begin to increase acquire essentially the same gradient in the graphic representations even if the lamps have individual differences. In accordance with the invention, using such a phenomenon, it became possible to anticipate the lifetime of a rare gas discharge lamp. In the invention, a graphic representation of the value of the swing width of the voltage made beforehand with respect to the length of illumination of the lamp means that these graphic representations are produced or that they are acquired as data and these data are input beforehand into the above described basic data storage mechanism.

The invention relates to a process for anticipating the lifetime of a rare gas discharge lamp which is characterized in that the rare gas discharge lamp is supplied with a certain current which is lower than the rated current, that the voltage of the rare gas discharge lamp is determined at this instant and the value of the swing width of this voltage is measured and that by the value of the swing width of this voltage the service life of the rare gas discharge lamp is anticipated. The invention relates furthermore to a system for carrying out the process. Generally the flicker phenomenon of the rare gas discharge lamp can be determined as the swing width of the lamp voltage. Conventionally it was however extremely difficult to determine the sign of the rise of the flicker level beforehand because the flicker level increases quickly within a short time even if the attempt is made to check the level at which use as a lamp is no longer possible due to formation of the flicker phenomenon by the lamp being operated at the rated current and by examining the swing width of the voltage at the rated current.

In the process in accordance with the invention for anticipating the service life of a rare gas discharge lamp, based on recent findings of the inventors, anticipating the service life of a rare gas discharge lamp at any time is enabled by the measure that the lamp with a lifetime which is to be measured at any time is supplied with a certain current which is lower than the rated current, that the voltage is determined at this instant, that the value of the swing width of the voltage is measured and that the value of the swing width of this voltage is used. The above described recent findings of the inventors are:

1) When the current is fixed at a lower value than the rated current, the instant at which the value of the swing width of the voltage increases occurs earlier than in the case of operation at the rated current.
2) In the case of operation of the same type of lamp under the same current conditions, for the two lamps, the difference between the instant at which, in the case of operation at the rated current, the value of the swing width of the voltage begins to increase, and the instant at which the value of the swing width of this voltage begins to increase in the case of a lower value of the current than the rated current, becomes identical.
3) The values of the swing width of the voltage after the start of the increase of the values of the swing width of the voltage for the two lamps acquire the same gradient in the graphic representations.

In the system in accordance with the invention for anticipating the lifetime of a rare gas discharge lamp, the anticipation of the service life of the lamp is enabled by the following measures.

At any instant of a lamp with a lifetime which is to be measured, the current is fixed lower than the rated current by a current control means.

The value of the swing width of the voltage at this instant is determined by a means for determining the swing width of the voltage, this value is compared to data of the basic data storage mechanism by a comparison means which compares these values to one another, in the basic data storage mechanism the lamp being operated beforehand with the rated current, and the value of the swing width of the voltage being stored which is determined in the case in which the current at any time is fixed at a lower value than the rated current.

The difference between the values of the swing width of the voltage is input into the duration of service life conversion means and the measured value of the swing width of the voltage is converted into service life.

The invention is explained in detail below with reference to the accompanying drawings.

DETAILED DESCRIPTION OF THE INVENTION

Figure 1:
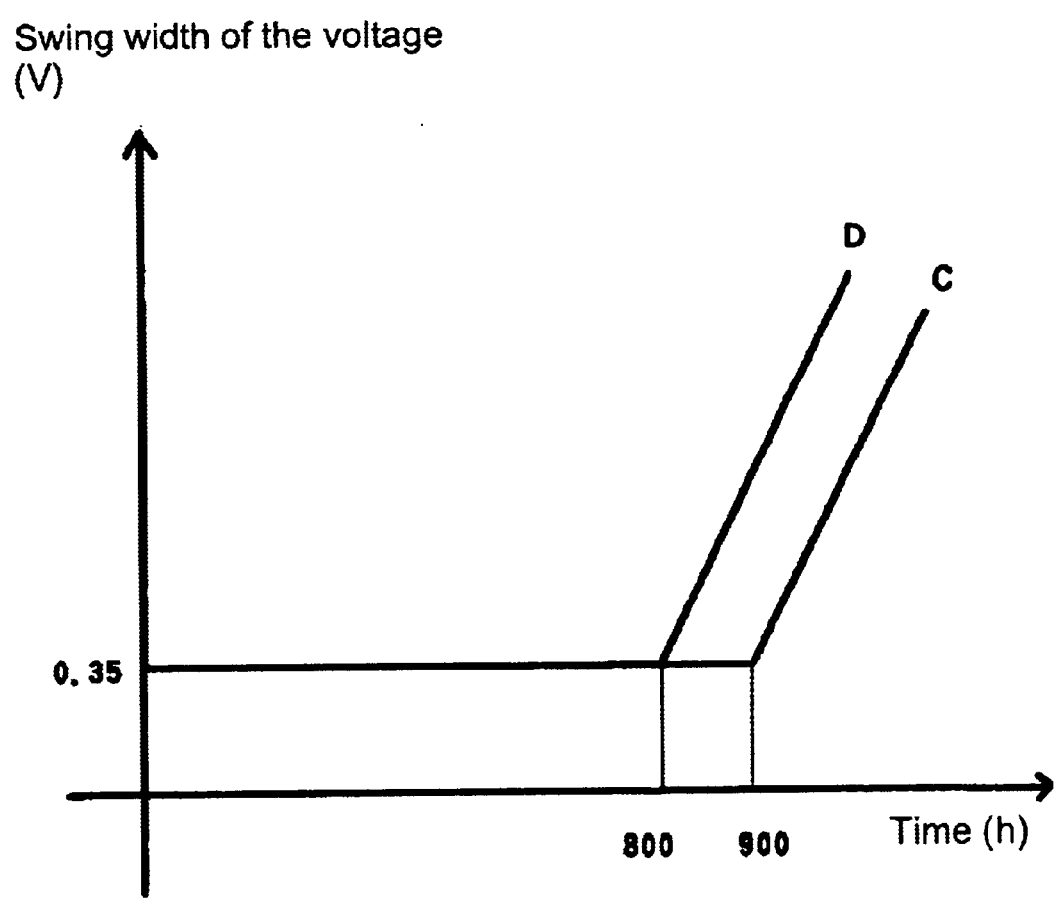
FIG. 1 shows a schematic of the relation between the length of illumination of the lamp and the value of the swing width of the voltage.
Figure 2:
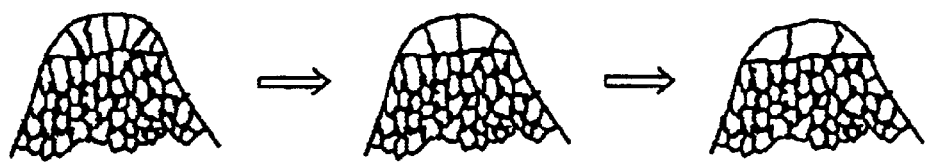
FIGS. 2A to 2C show schematic cross sections of the tip area of a lamp cathode.
Figure 3:
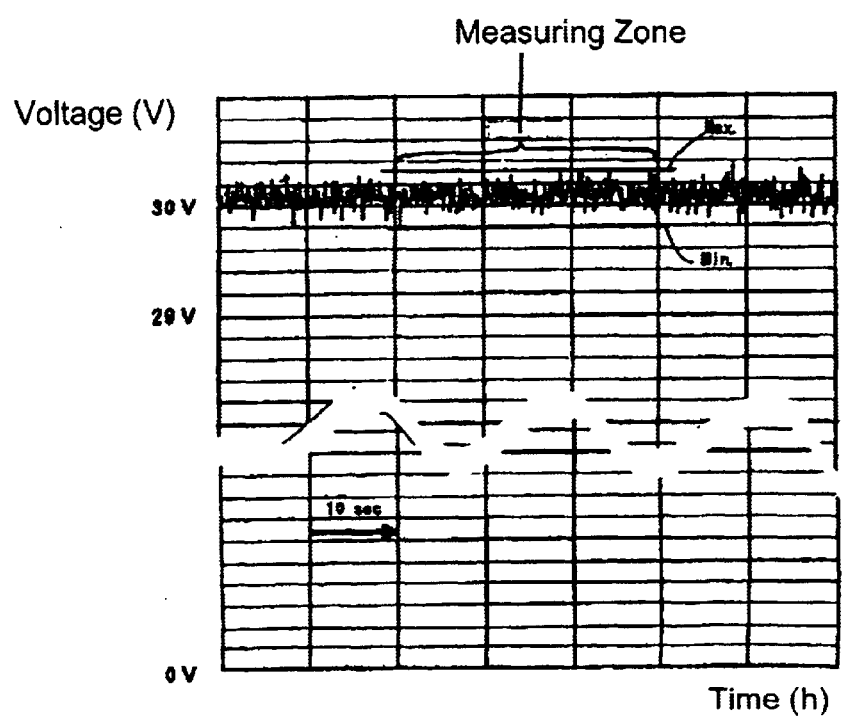
FIG. 3 is a plot of the data of the voltage value of a rare gas discharge lamp.
Figure 4:
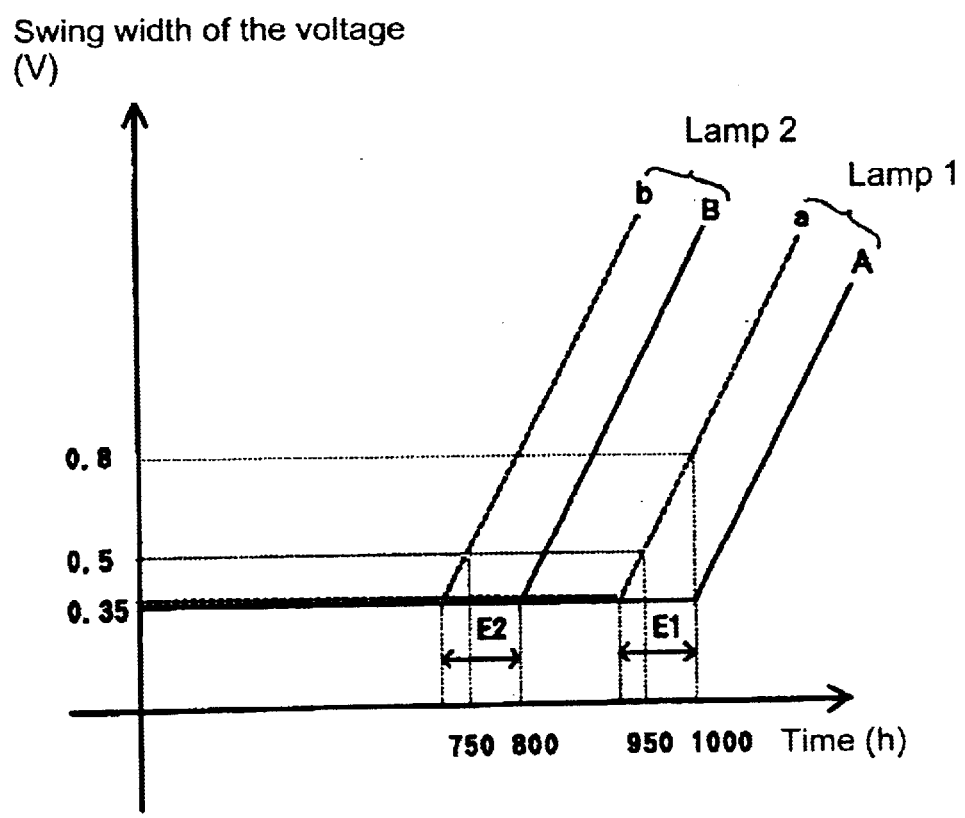
FIG. 4 is a graph illustrating the relationship between the length of operation of two types of rare gas discharge lamp of the same type and the value of the swing width of the voltage.

The process in accordance with the invention for anticipating the lifetime is described below using one embodiment, the lamps 1 and 2 according to FIG. 4 being taken as the example. These lamps are operated with a rated current of 80 A. The value of the swing width of the voltage (magnitude of the voltage fluctuation as indicated above) during operation with the rated current of 80 A is shown using the graphic A of the lamp 1 and the plot B of the lamp 2. Furthermore, the value of the swing width of the voltage during operation with a rated current which has been reduced to 40 A is shown using the graphic a for the lamp 1 and the plot b for the lamp 2. The lifetime of these lamps before occurrence of the flicker phenomenon is defined by the time at which the value of the swing width of the voltage at the rated current exceeds 0.35 V. In the lamp 1, the time of the service life of the lamp before occurrence of flicker is roughly 1000 hours, while 50 hours before, specifically at 950 hours, the value of the swing width of the voltage at a rated current of 80 A is essentially the same as at the start of operation. The value of the swing width of the voltage when the current drops to 40 A is however 0.5 V. This value represents the swing width of the voltage which can be determined to a sufficient degree compared to 0.35 V at the start of operation.

In the lamp 2, the time of the end of the service life of the lamp based on flicker is roughly 800 hours. The value of the swing width of the voltage when the current drops to 40 A, 50 hours before, is 0.5 V. Proceeding from the above described circumstance, it is expected that, in this type of lamp, the value of the swing width of the voltage is 0.5 V when the current drops to 40 A 50 hours before the end of the service life of the lamp. The process in accordance with the invention for anticipating the lifetime of the lamp using these conditions makes it possible to anticipate that the remaining lifetime up to the end of the lifetime of the lamp by flickering is 50 hours, if, for example, in lamps of the same type, the value of the swing width of the voltage is determined to be 0.5 V when the current drops to 40 A.

Another execution of the process in accordance with the invention for anticipating the lifetime is described below. In the lamp 1 in FIG. 4, the value of the swing width of the voltage at 1000 hours increases quickly, and here, flickering has formed when it is operated at a rated current of 80 A. At this time of 1000 hours, i.e., called the lifetime of the lamp, it is shown that the value of the swing width of the voltage is 0.8 V in the case of operation with 40 A. Next, the value of the swing width of the voltage in the case of operation of the lamp 1 with 40 A is stored in a basic data storage mechanism as shown by graphic a in FIG. 4. The time difference which is determined by comparison of the value of the swing width of the voltage when the current drops to 40 A at any time and the value of the swing width of the voltage of the lamp in the case of operation with 40 A at the time of 1000 hours known beforehand, is converted into the remaining lifetime. This means that the time can be found which corresponds to the value of the swing width of the voltage when the value of the swing width of the voltage is examined at the time at which the current has dropped to 40 A, when the plots A and a of the lamp 1 are produced beforehand (input into the basic data storage mechanism). Thus the remaining lifetime of the lamp can be anticipated.

Another execution of the process for anticipating the lifetime is described below. It can be considered that the plot a and plot b in FIG. 4 have the same gradient and thus the lifetime of the lamp can be anticipated. Since the plot b and plot a have the same gradient, the remaining service life of the lamp 2 is determined in the following way, even if the plot B and the plot b of the lamp 2 have not been produced beforehand. For lamp 2, the current is reduced to 40 A at any time. Based on the value of the swing width of the voltage at this instant, using plot a, the time corresponding to this value is determined. This time is subtracted from 1000 hours, which represents the service life in plot a. The resulting value represents the, remaining lifetime of the lamp 2. The above described process enables anticipation of the lifetime of a lamp of the same type (lamps with the same rated current) when the plot A and the plot a of lamp 1 are produced beforehand.

Figure 5:
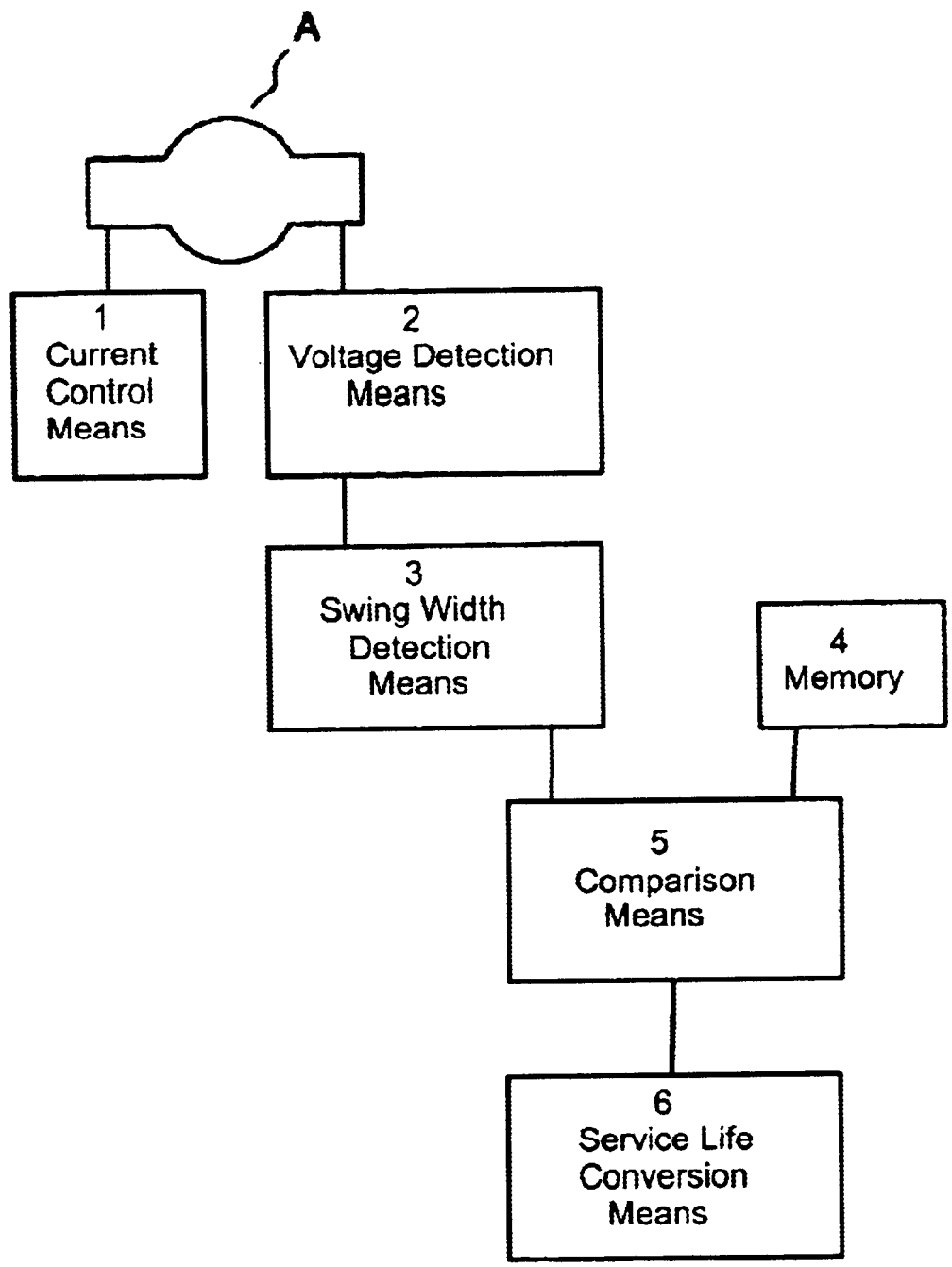
FIG. 5 shows a schematic diagram representing an example of the system in accordance with the invention for anticipating the lifetime of a rare gas discharge lamp.

The system in accordance with the invention for anticipating the lifetime of a rare gas discharge lamp is described concretely below. FIG. 5 shows one execution of the system in accordance with the invention for anticipating the lifetime of the rare gas discharge lamp. This system for anticipating the lifetime comprises the following:

- a current control means 1 which controls the current of the rare gas discharge lamp A;
- a voltage detection means 2 which determines the voltage of the rare gas discharge lamp;
- a voltage swing width detection means 3 which determines the value of the swing width of the voltage based on the voltage which has been determined by the voltage detection means 2;
- a separate basic data memory mechanism 4 which stores the value of the swing width of the voltage which is determined beforehand for the rare gas discharge lamp operated with the rated current by fixing the current at a lower value than the rated current at any time;
- a comparison means 5 which compares the value of the measurement of the swing width of the voltage of the rare gas discharge lamp by the voltage swing width detection means 3, when the above described current control means 1 supplies a certain current which is lower than the rated current, to the data of the above described basic data memory mechanism 4; and
- a duration of service life conversion means 6 which, based on the difference between the values of the swing width of the voltage which are compared by the comparison means 5, converts them into the service life of the rare gas discharge lamp.

In the system in accordance with the invention for anticipating the lifetime, at any time of a lamp with a service life which is to be determined, the current is made lower than the rated current by the current control means 1. The voltage is determined by the voltage detection means 2 and the value of the swing width of the voltage at this time is determined by the swing width of the voltage detection means 3. This value is compared to the data of the basic data storage mechanism 4 by the comparison means 5 which compares these values to one another, the basic data storage mechanism 4 storing the value of the swing width of the voltage which is determined in the case in which the lamp is operated beforehand at the rated current and that at any instant the current is fixed at a value which is lower than the rated current. This difference between the values of the swing width of the voltage is input into the duration of service life conversion means 6 by which the above described measured value of the swing width of the voltage is converted into the service life and by which the lifetime of the lamp is anticipated.

Figure 6:
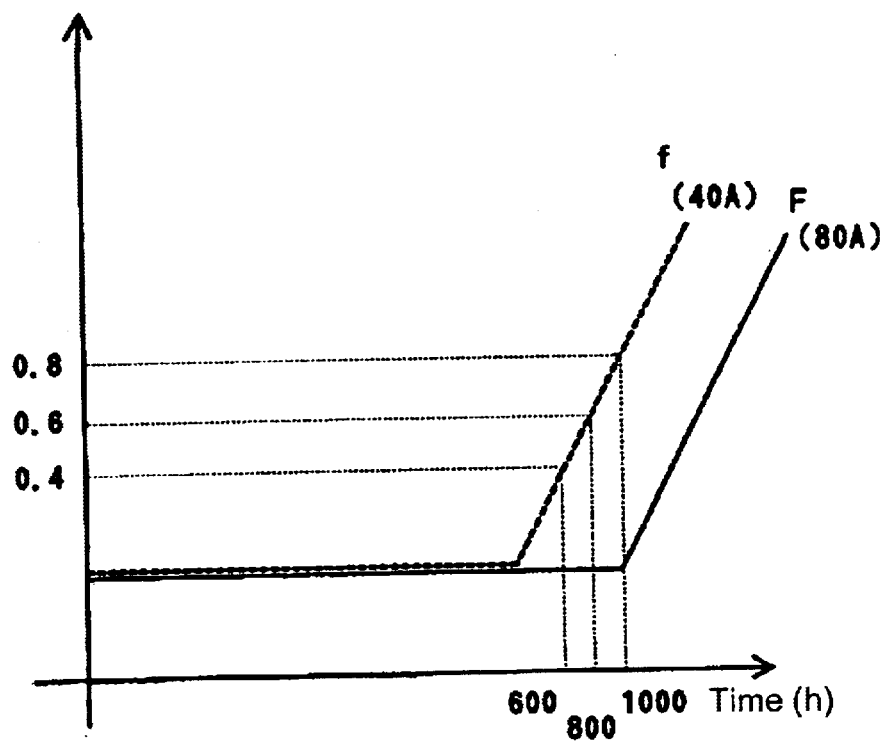
FIG. 6 is a graph illustrating the relationship between the duration of lamp illumination and the value of the swing width of the voltage.

In the system in accordance with the invention for anticipating the lifetime, the process described below for assessment is shown by way of example, when it is described, for example, using the plots shown in FIG. 6. The data of the plot F of the value of the swing width of the voltage in the case of lamp operation with a rated current of 80 A are input beforehand into the basic data storage mechanism 4 and stored in it. In the production of the plot F, the data of the plot f of the value of the swing width of the voltage in the case of operation at any time at a current of 40 A which is lower than the rated current are input into the basic data storage mechanism 4 and stored. Next, the value of the swing width of the voltage of plot f when flicker occurs and the data of the time are likewise stored. In this case, the value of the swing width of the voltage is 0.8 V and the time is 1000 hours. They are detected as the data of the basic data storage mechanism 4. It becomes apparent from the plot f that the lifetime is 200 hours when the value of the swing width of the voltage is 0.6. Each lamp acquires the same gradient as plot f.

Next, the value of the swing width of the voltage of the voltage is measured when at any instant of a lamp with a service life which is to be measured, the current is set to 40 A. The assessment is performed as follows.

When this value is greater than or equal to 0.6, the remaining lifetime is less than 200 hours. When this value is less than or equal to 0.6, the remaining lifetime is greater than or equal to 200 hours. Furthermore, it becomes apparent that the remaining lifetime is 400 hours when this value is 0.4. Thus, it becomes apparent that plot f and this value are placed over one another. Furthermore, the current value in the case of the value of the swing width of the voltage of 0.6 is measured by several currents being allowed to flow beforehand and by storing how much service life remains when, at a value of the swing width of the voltage of 0.6, a lower current than the rated current is allowed to flow. Thus, the service life which corresponds to this value is assessed based on the service life stored beforehand.

Action of the Invention

As was described above, the invention relates to a process for anticipating the lifetime of a rare gas discharge lamp and a device for carrying out the process. The following special effects can be obtained by the invention:

1) The timing with which the flicker level characteristic for each rare gas discharge lamp increases can be anticipated.
2) In this way, the time at which the level is reached at which the lamp can no longer be used as a result of flicker, can be anticipated and the lifetime of the rare gas discharge lamp can be anticipated.
3) The lifetime of this lamp can be anticipated at any instant of the duration of its operation.
4) A system for anticipating the lifetime of a rare gas discharge lamp can be devised which is used in the implementation of this process.

What is claimed is:

1. Process for anticipating the lifetime of a rare gas discharge lamp in which an arc tube contains an opposed anode and cathode and in which the cathode contains an emitter substance, comprising the steps of:

supplying the rare gas discharge lamp with a reduced current which is lower than the rated current, determining the voltage of the rare gas discharge lamp at the time that the reduced current is supplied and measuring the swing width of said voltage, and using the measured swing width of said voltage to anticipate the service life of the rare gas discharge lamp.

2. Process for anticipating the lifetime of a rare gas discharge lamp in accordance with claim 1, wherein the remaining life of the lamp is anticipated by taking as a reference a difference between the time at which the value of the swing width of the voltage begins to increase in the case of operation with the rated current, and the time at which the value of the swing width of the voltage begins to increase in the case of operation of the lamp with said reduced current.

3. Process for anticipating the lifetime of a rare gas discharge lamp in accordance with claim 1, wherein the remaining life of the lamp is anticipated by comparing the swing width of the voltage at said reduced current to the swing width of the voltage at an instant of occurrence of flickering measured in the case of operation of the lamp with said reduced current that has been determined beforehand.

4. Process for anticipating the lifetime of a rare gas discharge lamp in accordance with claim 1, wherein the value of the swing width of the voltage which is determined in the case of operation with the rated current, and the value of the swing width of the voltage which is determined in the case of the reduced current are graphed beforehand with respect to the length of operation of the lamp, and wherein the value of the swing width of the voltage which is determined in the case in which, at any instant of a lamp of the same type with a lifetime which is to be measured, the current is fixed at said reduced current, is converted into the remaining life of the lamp based on said graphic representation.

5. System for anticipating the lifetime of a rare gas discharge lamp in which an arc tube contains an opposed anode and a cathode and in which the cathode contains an emitter, comprising:

a current control means for controlling current supplied to the rare gas discharge lamp;

a voltage detection means for determining the voltage of the rare gas discharge lamp;

a voltage swing width detection means for determining a swing width of the voltage based on the voltage determined by said voltage detection means;

a basic data memory mechanism which stores values of the swing width of the voltage for the rare gas discharge lamp operated with the rated current which have been measured beforehand by operation of the lamp with said reduced current that;

a comparison means for comparing measured values of the swing width of the voltage of the rare gas discharge lamp when the above described current control means supplies a reduced current which is lower than the rated current, to data stored in said basic data memory mechanism and for outputting a difference value corresponding to the difference between; and a duration of service life conversion means for converting the difference value output by said comparison means into an indication of the service life of the rare gas discharge lamp.

* * * * *